PHASE ANGLE CONTROL CIRCUIT USING SBS

Filed Feb. 29, 1968

INVENTOR.
JAMES H. GALLOWAY
BY
Paul E. Rockford
ATTORNEY

United States Patent Office 3,493,848
Patented Feb. 3, 1970

3,493,848
PHASE ANGLE CONTROL CIRCUIT USING SBS
James H. Galloway, Cato, N.Y., assignor to General Electric Company, a corporation of New York
Filed Feb. 29, 1968, Ser. No. 709,282
Int. Cl. G05f *1/40, 1/52, 1/60*
U.S. Cl. 323—22 2 Claims

ABSTRACT OF THE DISCLOSURE

A solid state switching and power control circuit is provided having a firing sub-circuit capable of operating at low power value to achieve a hysteresis free operation of the solid state power control unit.

The present invention relates to a circuit for controlling the supply of alternating current power to a load such as an electric lamp. More particularly, the present invention relates to a circuit in which the components are combined to provide a highly efficient operation with no hysteresis and in which the combined components can be provided at low cost due to suitability for fabrication with thick film techniques for control of supply of electric power.

Solid state switching devices, and circuits incorporating such devices adapted for use in the control of electric power, have been provided at progressively lower cost as the state of this art advances. In order to reach progressively lower cost levels in furnishing power control units or devices incorporating solid state switches to the public, the number of auxiliary components such as resistors, capacitors, diodes, and the like which are conventionally incorporated in such circuits has been progressively minimized or the components used have been of progressively lower cost in the sense of having lower tolerance components, i.e., components having values within a broader range of possible variation. Also to improve performance with components of lower tolerance "trimming" steps are sometimes employed. Trimming involves adjustment of component value or values after a circuit has been formed from a particular set of components to give the adjusted components the best component value for that specific circuit. Such trimming adjustment amounts to a post-assembly operation and, although performed only once, adds cost to the assembly and fabrication. Trimming has the effect of increasing labor costs which can in part offset a reduction in parts costs. Trimming can only partly offset the variation of component values with time or "drift" of such values of lower cost components. The components affected are those used to make the solid state switch operate responsive to changes of the phase angle of an RC subcircuit and include the resistance and capacitance of the RC subcircuit. The number and the individual variability of the components used have been reduced to the point where performance of the power control devices having low cost is erratic in the sense that the relationship between the movement of a control element such as the turning of a manual control knob and changes of the level of power supplied through the solid state switch of the circuit controlled by the manual element is far from linear.

Use of combinations of elements which have been furnished heretofore at low cost can have the undesirable effect of concentrating the changes in power level into a short range of movement of the manual control element. Particularly, non-linear relationships are found together with a "pop-on" type of performance as the user manipulates the manual control element to change the level of power furnished to a load through the solid state switching element responsive to operation of elements of a triggering subcircuit. Also, the power level supplied to the load tends to follow a hysteresis type of path as the control element is manipulated to reduce the power level. The hysteresis path is more variable from one device to another than is desirable for economic manufacture of devices of high performance and reliability.

One scheme which offers an opportunity to improve the performance of power control circuits without significantly increasing the cost of such circuits is the so-called thick film technique by which a number of passive circuit components can be added at comparatively small incremental cost for the addition of each component of the circuit. The thick film technique offers the advantage therefore of permitting production of power control devices having high performance capabilities with a disproportionately small increase in the cost of the device for the addition of individual passive components. Similarly where the volume of circuits is sufficiently high to justify the expense of developing a fabricating capability and the nature of the components is compatible, passive elements can be included with power control elements to yield high performance circuits by the integrated circuit technique according to which the passive components and circuit connections are formed integrally and simultaneously with the solid state power control element. However, not all combinations of elements are suitable for formation into integrated circuits.

A factor which has limited the reduction of the cost of conventional power control devices, such as light dimmers, without sacrificing performance capability is the need for discrete packaging of the discrete components used in the more conventional power control circuits. The use of unpackaged components has been limited in circuits formed with discrete components because, in addition to the cost of the fabrication or purchase of the components, there is the additional need for and cost of interconnecting the discrete components of the circuit as well as the need for and cost of handling, assembling, and maintaining relatively large dimensional clearances between the exposed interconnections. In general, the use of unenclosed components such as solid state chips is not compatible with the size of the structure resulting from assembly of discrete component circuits even where the reduced size advantage of printed circuit board type of interconnection is employed.

From the foregoing it will be evident that a technique such as the thick film technique which makes possible the formation and/or use of unenclosed circuit components and which makes possible the low cost interconnection of a larger number of circuit elements at a low incremental cost per element would be a very valuable advance in the art of forming solid state power control devices.

In the addition of components, either discrete or thick film, the preference is for the addition of resistance elements rather than for addition of capacitors because of the greater reliability of the resistance components, the smaller volume of the resistances, and the resultant lower cost of the resulting devices. In general the formation of capacitors integral with thick film structure is limited by the overall dimensions of the device in which the capacitors are formed. This is because a limited capacitance can be obtained within a given area of single thickness of a thick film structure.

One problem which affects the suitability of a circuit for thick film fabrication is the need to adjust or calibrate component values after a particular circuit has been formed.

A circuit described in Application Note 200.35 of the Semiconductor Department of General Electric Company and published in March 1966 illustrates in FIGURE 11 thereof a circuit also shown in FIGURE 3 of this application which has a trimming res'stor which must be adjusted to a given value after the circuit elements are combined but before the circuit is put into operating use. This adjustment of the trimming resistor value reduces the hysteresis to a negligible region. As indicated the circuit will control 5% to 95% power in the load but is subject to supply voltage variations and the pop-off phenomena described below.

A circuit which is subject to "pop-on" due to its following a hysteresis path of illumination relative to control knob movement can be set at an illumination level below the "pop-on" level by positioning the control knob to a lower level after first exceeding the "pop-on" level. However, variations in line voltage can cause the lamp to pop-off particularly as the result of a temporary line voltage dip which frequently attends the turning on of an appliance or the like energized from the same line which supplies power to the pop-on lamp circuit. This pop-off occurs usually when the line voltage drops for a single cycle of the AC power energizing the lamp. Such a pop-off can be dangerous of course where the low lever of power supply established by a low setting of the control element of the circuit is used for safety purposes as in illuminating a stairwell during the night or for similar purposes.

It is accordingly an object of the present invention to provide a low cost solid state power control device having high performance capabilities particularly substantial elimination of hysteresis which can cause pop-on or pop-off of lamp dimming circuits.

It is a second object of the present invention to provide a device having greater reliability of performance due to a lower level of stress on the component parts, particularly a reduced stress of the capacitor elements of the circuit.

Another object of the present invention is to provide a device adapted to manufacture in thick film form.

Still another object is to provide a solid state power control device in smaller overall dimensions at reduced cost.

Additional objects and advantages of the present invention will be in part apparent and in part pointed out in the description which follows.

In one of its broader aspects the objects of the present invention are achieved by providing a firing circuit for a gated solid state power control device adapted for continuous control of alternating current power over a broad range of power values, said firing circuit being connected in parallel to said power control device across the line supplying power thereto, and the second terminal being connected through a resistance to the side of the power line to which the variable resistance is connected.

Said firing circuit including a silicon bilateral switch having two terminals, one of said terminals being connected to the junction of a series connected R-C couple, the resistance of said couple being at least a portion of a variable resistance and being connected to one side of the power line, the second terminal of the silicon bilateral switch being connected to the junction of a second series connected R-C couple, the resistance of the first couple and to the other side of the power line, and the capacitor of said second couple being connected to the gate of said solid state power control device.

The manner in which the objects and advantages of the present invention are achievable will be better understood by reference ot the accompanying drawing in which.

Figure 1:
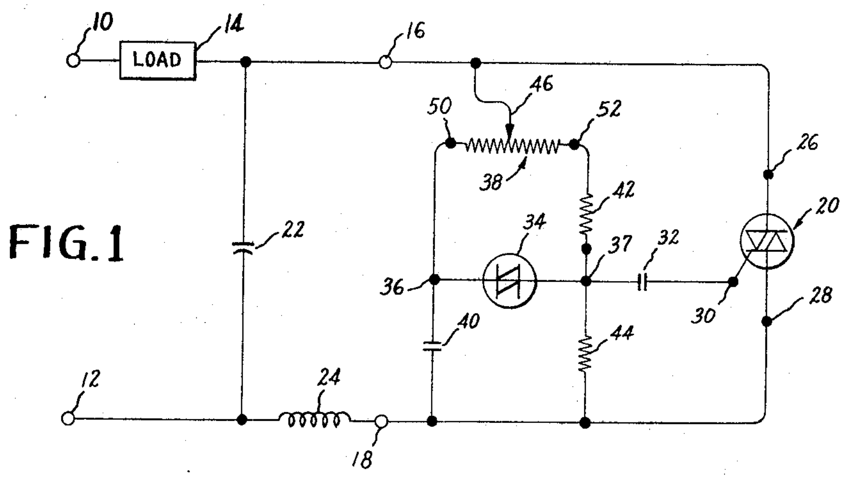
FIGURE 1 is a circuit diagram of a preferred form of the circuit of the present invention.

Referring now to FIGURE 1, a circuit of an alternating current power control device is shown for operation across an alternating voltage source connected at electrodes 10 and 12. Load 14 is connected in series in the circuit between electrodes 10 and 16 and the power control device is connected in series in the circuit between electrodes 16 and 18. The flow of power current between electrodes 16 and 18 is controlled by the gated solid state power control element 20.

Capacitor 22 and inductance 24 perform their conventional roles in such devices filtering radio frequency emissions generated by the switching of the solid state power control element 20.

Power control element 20 is a gated symmetrical solid state switch, such as a triac, normally having high impedance when a changing voltage is imposed across power electrodes 26 and 28 but which is switched to a low impedance state when the voltage exceeds the value in a range which is a characteristic of the device, or when a triggering pulse is imposed through the trigger electrode 30.

The triggering pulse is supplied to trigger electrode 30 through capacitor 32 from a silicon bilateral switch 34, designated herein as SBS. The SBS may consist of two unilateral triggering units connected in reverse parallel configuration or it may consist, as used in this application, of a single integrated element containing the two unilateral units connected in reverse parallel.

The SBS is a device as described in the Aug. 30, 1966, issue of Electronic Design the disclosure of which is incorporated herein by reference and this device provides a symmetrical bi-directional triggering function.

The SBS is also the subject of a copending application for patent of Thomas C. Mapother, Ser. No. 509,700 filed Nov. 26, 1965, now Patent No. 3,427,512 issued Feb. 11, 1969, and assigned to the owner of the present application.

The SBS, 34, is electrically coupled to the junction electrode 36 of the variable resistor 38 and the capacitor 40 of the phase shift network made up of these elements. The phase shift network is serially coupled to the power terminals 16 and 18.

Also serially coupled to power terminals 16 and 18 through a portion of variable resistance 38 are the resistances 42 and 44.

The contact arm 46 of potentiometer 38 is connected to power terminal 26 of solid state switch 20. In essence this is a potentiometer with two fixed terminals and a wiper terminal, the fixed terminals of the potentiometer being connected in parallel with the switch 34 and the wiper terminal being connected to one side of the power line.

The section of the potentiometer 38 between the contact arm 46 and terminal 50 forms with the capacitor 40 a variable time constant charging circuit. The portion of the potentiometer 38 between the contact arm 46 and the potentiometer terminal 52 forms a voltage divider with the serially connected resistances 42 and 44. The voltage on capacitor 40 is therefore a variable amplitude cosine wave, while the voltage on resistance 44 is the divided sine wave of the line voltage.

When the potentiometer contact arm 46 is at the right hand potentiometer terminal 52, the voltage across the SBS, 34, reaches the breakover voltage at the end of each half cycle of the alternating current power supply. However, since at this time the voltage across resistance 44 which is a relatively low impedance source, is decreasing most rapidly, there is more break over current available to the SBS than would be expected from a simple RC phase shift network of the same impedance level as that from the portion of potentiometer resistance 38 in series with capacitor 40, together with the capacitor 40.

In a specific circuit, as shown in FIGURE 1, the values of the components were as follows:

Capacitor 40 had a capacitance of 0.1 microfarad at 10 volts or greater. Potentiometer resistor 38 had a value of 500 kilohms. Resistor 42 had a value of 100 kilohms.

Resistor 44 had a value of 12 kilohms and capacitor 32 a value of 0.1 microfarad at 10 volts or greater. In a test circuit in which the components used had the values indicated above, the SBS always fired before the end of the half cycle providing a hysteresis free operation.

Capacitor 32 serves to couple the pulse from capacitor 40 and the SBS to the triac gate electrode 30. The time constant of the capacitor 32 and resistor 44 is small compared to one-half cycle, so that the presence of capacitor 32 does not seriously affect the voltage on resistor 44.

Also, in a circuit having the component values indicated above, the SBS must have a breakover current of less than 200 microamperes. The SBS 34 fires at a voltage of ten volts or lower as compared to prior devices which fired at voltages of the order of 32 volts or higher. Accordingly capacitors having high reliability can be incorporated in thick film devices in a form which imposes no stress on the capacitors. Attempts to incorporate capacitors of the conventional higher capacitor ratings as required for conventional solid state power control devices can impose stress on the circuit elements of a thick film device to yield uncertain and unreliable performance.

Figure 2:
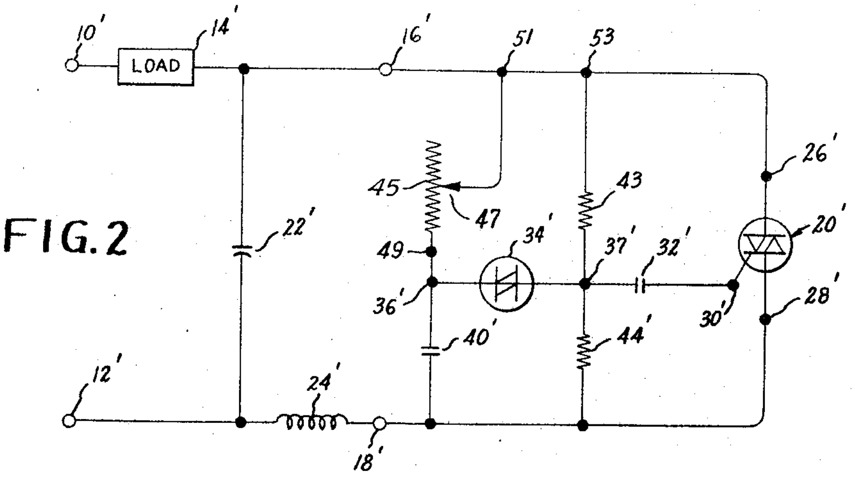
FIGURE 2 is a circuit diagram of an alternative form of the circuit of the present invention shown in FIGURE 1.

In the alternative form of the circuit shown in FIGURE 2 the parts are labeled with the same numbers used in FIGURE 1 but a prime (′) is added to indicate that essentially the same description is applicable and that the parts serve essentially the same functions described for the similarly numbered parts of FIGURE 1.

The major differences of the circuit of FIGURE 2 from that of FIGURE 1 concerns the resistances through which the SBS terminals 36 and 37 are connected to the upper side of the power line.

In the circuit of FIGURE 2 the resistances 45 and 43 are in essence a series connected resistance pair connected in parallel with the switch 34′ and connected at the junction thereof to the upper side of the power line. The resistance connected to the capacitor 40 forms the resistance of the phase shift R-C couple. This couple is in parallel with the power switch and its resistance is a variable resistance variable by movement of 47 to provide the phase shift responsive to changes in values of this variable resistance.

In a circuit as shown in FIGURE 2 the following values of circuit components were used with hysteresis free operation. Variable resistor 45 was 500 kilohms; resistor 43 was 100 kilohms; resistor 44′ was 10 kilohms and the other components had the values given for circuit 1 components.

The circuits taught herein can appear deceptively simple when compared to other circuits. A circuit which gives comparable hysteresis free operation, for example, is the circuit which includes a unijunction transistor as an element of a firing circuit. However, the cost of such circuits is comparatively quite high because of the requirements of additional circuit components which must be employed with the unijunction transistor.

Figure 3:
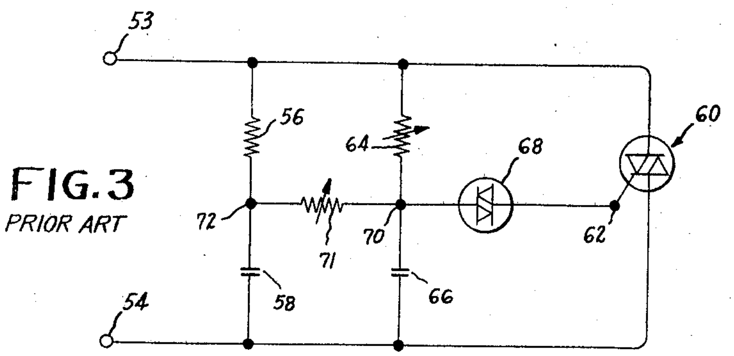
FIG. 3 PRIOR ART
FIGURE 3 is a circuit diagram of a conventional circuit over which the circuits of FIGURES 1 and 2 are improvements.

Also it might appear that improved operation might be achieved by simple substitution of an SBS in place of a diac in the conventional circuit shown in FIGURE 3 and incorporating a diac as an element of the firing subcircuit.

In this conventional circuit power flowing between electrodes 53 and 54 is controlled by firing signals received at gate electrode 62 of power control element 60 from a triggering subcircuit. This subcircuit comprises the series connected RC network of resistor 56 and capacitor 58, the second series connected RC network of variable resistor 64 and capacitor 66, both of which are connected in parallel with power control element 60, and also the diac 68 connected between gate electrode 62 and the series connection of the junctions 70 and 72 of the two RC networks through a resistor or trimming resistor 71.

On the contrary, the substitution of an SBS into such a circuit worsens the hysteresis even when adjustment of circuit component values is made to overcome the increased hysteresis.

The advantageous improvements in circuit operation attained in the circuit of FIGURES 1 and 2 are also lost when a diac is substituted for the SBS, 34, of this circuit.

Another important advantage is the elimination of hysteresis in assembly of circuits using comparatively low tolerance components. For example tight tolerance components (10%) can be employed to form a unit in accordance with FIGURE 3 which exhibits low hysteresis where the trimming resistance 71 is adjusted very precisely. With such adjustment the unit will have low hysteresis only for the line voltage to which the device is adjusted. When line voltage changes the hyteresis problem can reappear.

However the circuit of FIGURE 1 has been formed using components of the same tolerance level and has been shown to operate free of hysteresis with no trimming operation at all. Moreover the hysteresis free operation is not subject to changes in line voltage.

In other words the circuit of FIGURE 3 is susceptible to hysteresis even when optimum component values are used. By contrast, the products employing the circuits of this invention are inherently free of hysteresis.

Accordingly components of lower tolerances and lower cost can accordingly be used to produce devices free of hysteresis and without need for trimming and the product formed is not as susceptible to variations in line voltage as prior art devices such as those formed in accordance with the circuit of FIGURE 3.

One of the principal advantages of the circuits described above is the capability for operating at relatively low firing angles. This gives the fuller range of effective control of the power at the terminals 16 and 18. More importantly, the low firing voltage permits a lower voltage capacitor to be employed due to the lower voltage at which firing takes place.

The lower voltage capacitor is important in that it permits use of thick film techniques for a full hysteresis-free power control device of moderate dimensions. It is the overall dimensions of the capacitor elements of power control circuits which limit the application of thick film techniques to solid state power control circuitry. Accordingly, it is the use of the combination of elements such as those taught in the circuit of FIGURE 1 which permit highly effective hysteresis free solid state power devices to be built at lower cost and in small size enclosures.

Since many applications and embodiments may be made of the circuit illustratively taught herein and since some component modifications can be made without loss of advantages taught herein, the foregoing should be interpreted as illustrative and not as limiting the scope of the invention.

What is claimed is:

1. A firing circuit for a gated solid state power control device adapted for continuous control of alternating current power over a broad range of power values, said firing circuit being connected in parallel with said power control devices across the line supplying power thereto, said firing circuit including a silicon bilateral switch having two terminals, said switch being connected from a first of its terminals through a first capacitor to the gate of said gated solid state power control, a series connected resistor network connected in parallel with said bilateral switch and a junction of said resistor network being connected to the first side of the power line, one of the resistors of said resistor network being variable and being connected to a second terminal of the bilateral switch and to a capacitor of a first resistor capacitor network, said first resistor capacitor network being connected in parallel with said bilateral switch and the junction of said network being connected to the second side of the power line and the resistor of said first resistor capacitor network being the resistance of a second resistor capacitor network, said second network having the first capacitor as the capacitance thereof, and said second network being connected betwen the second power line and the trigger of said power control device.

2. A firing circuit for a gated solid state power control device adapted for continuous control of alternating current power over a broad range of power values, said firing circuit being connected in parallel with said power control device across the line supplying power thereto, said firing circuit including a silicon bilateral switch having two terminals, said switch being conected from a first of its terminals through a first capacitor to the gate of said gated solid state power control, a potentiometer with two fixed terminals and a wiper terminal, the fixed terminals of said potentiometer being connected in parallel with the bilateral switch, the wiper terminal being connected to one side of the power line, a series connected resistance capacitance network connected in parallel with said bilateral switch, the junction of said network being connected to the opposite power line, and the resistance of said network being the resistance of a second series connected resistance capacitance network, said second network having the first capacitor as the capacitance thereof, and said second network being connected betwen the opposite power line and the trigger of said power control device.

References Cited

UNITED STATES PATENTS 3,188,490 6/1965 Hoff et al.
3,447,067 5/1969 Spofford.

LEE T. HIX, Primary Examiner

A. D. PELLINEN, Assistant Examiner

U.S. Cl. X.R.

307—297; 315—194; 323—24, 36